(12) United States Patent
Higashi et al.

(10) Patent No.: US 12,497,129 B2
(45) Date of Patent: Dec. 16, 2025

(54) BICYCLE

(71) Applicant: YAMAHA HATSUDOKI KABUSHIKI KAISHA, Iwata (JP)

(72) Inventors: Tomoyuki Higashi, Shizuoka (JP); Mitsuharu Hasumi, Shizuoka (JP); Tatsuya Moriguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 601 days.

(21) Appl. No.: 17/978,298

(22) Filed: Nov. 1, 2022

(65) Prior Publication Data
US 2023/0136706 A1    May 4, 2023

(30) Foreign Application Priority Data

Nov. 2, 2021 (JP) .................................. 2021-179735

(51) Int. Cl.
| | |
|---|---|
| *B62M 6/50* | (2010.01) |
| *B62H 7/00* | (2006.01) |
| *B62J 45/412* | (2020.01) |
| *B62J 45/413* | (2020.01) |

(52) U.S. Cl.
CPC ............... *B62M 6/50* (2013.01); *B62H 7/00* (2013.01); *B62J 45/412* (2020.02); *B62J 45/413* (2020.02)

(58) Field of Classification Search
CPC . B62M 6/50; B62H 7/00; B62J 45/412; B62J 45/413
USPC ...................................................... 180/206.3
See application file for complete search history.

(56) References Cited

U.S. PATENT DOCUMENTS

| | | | | |
|---|---|---|---|---|
| 6,152,251 A | * | 11/2000 | Nagai ....................... | B62M 6/90 |
| | | | | 180/68.5 |
| 11,175,678 B2 | * | 11/2021 | Widmaier ............... | B62K 11/00 |
| 11,654,988 B2 | * | 5/2023 | Corbett .................... | B62H 1/10 |
| | | | | 180/6.5 |
| 2019/0308512 A1 | * | 10/2019 | Hasumi .................... | B62M 6/45 |
| 2020/0004271 A1 | | 1/2020 | Widmaier et al. | |

(Continued)

FOREIGN PATENT DOCUMENTS

| | | |
|---|---|---|
| EP | 2 476 605 A1 | 7/2012 |
| JP | 5418512 B2 | 2/2014 |
| JP | 2021-160607 A | 10/2021 |

OTHER PUBLICATIONS

Official Communication issued in corresponding Japanese Patent Application No. 2021-179735, mailed on Apr. 3, 2024.

*Primary Examiner* — Valentin Neacsu
*Assistant Examiner* — Michael R Stabley
(74) *Attorney, Agent, or Firm* — Keating & Bennett, LLP

(57) ABSTRACT

A bicycle includes a vehicle-body frame, a front wheel that is a steered wheel, a rear wheel, a crankshaft, a pedal, a transmission to transmit rotation of the pedal to the rear wheel, a motor to apply at least a torque to cause rearward rotation of at least one of the front wheel or the rear wheel, a roll detector to detect at least one of a roll angle or a roll angular velocity of the vehicle-body frame, and a steering detector to detect a direction of steering. When a vehicle speed is zero and a steering angle of the front wheel is not zero, the motor applies, to the at least one of the front wheel or the rear wheel, a torque to maintain the roll angle of the vehicle-body frame based on the detected direction of steering and the at least one of the roll angle or the roll angular velocity.

13 Claims, 13 Drawing Sheets

(56) References Cited

U.S. PATENT DOCUMENTS

2020/0406999 A1    12/2020  Corbett et al.
2021/0139103 A1*    5/2021  Gillett ............... B60W 60/0053

* cited by examiner

BICYCLE

CROSS-REFERENCE TO RELATED APPLICATION

This application is based upon and claims the benefit of priority to Japanese Patent Application No. 2021-179735, filed on Nov. 2, 2021, the entire contents of which are hereby incorporated herein by reference.

BACKGROUND OF THE INVENTION

1. Field of the Invention

The present invention relates to bicycles.

2. Description of the Related Art

Japanese Patent No. 5418512 discloses that, when a bicycle is traveling and turning with its vehicle body tilted toward a turning center, an electric motor is controlled so as to generate a torque in a direction that reduces an absolute value of the difference between a target roll angle and a real roll angle. The bicycle calculates the target roll angle based on balancing conditions between a first roll moment from gravity acting on the vehicle body during turning, and a second roll moment calculated from a target yaw angular velocity and the vehicle speed. The target yaw angular velocity depends on the steering angle and vehicle speed that have been detected. This prevents the bicycle from wobbling during turning while receiving centrifugal force during traveling.

The above-described conventional technique controls the attitude of the bicycle during traveling by means of the torque of an electric motor. However, it does not consider a control occurring when the vehicle speed is zero, i.e., the vehicle is not traveling, or is traveling at low speed. Typically, when the bicycle is not traveling, the rider usually puts their feet away from the pedals and in contact with the ground. In this case, the rider can control the attitude of the bicycle in the roll direction while their foot/feet on the ground.

SUMMARY OF THE INVENTION

In order to overcome the above described problems, the inventors of preferred embodiments of the present invention discovered systems to assist a rider, with their feet on the pedals, to control an attitude of a bicycle in a roll direction while the bicycle is not traveling.

Preferred embodiments of the present application provide bicycles that each assist a rider to control the attitude in the roll direction while the bicycle is not traveling and the rider has their feet on the pedals.

A bicycle according to a preferred embodiment of the present invention includes a vehicle-body frame, a front wheel rotatably supported by the vehicle-body frame that is a steered wheel, a rear wheel rotatably supported by the vehicle-body frame, a crankshaft rotatably supported by the vehicle-body frame, a pedal connected to the crankshaft to rotate together with the crankshaft, a transmission to transmit rotation of the pedal to the rear wheel, a motor to apply at least a torque to cause rearward rotation of at least one of the front wheel or the rear wheel, a roll detector to detect at least one of a roll angle or a roll angular velocity of the vehicle-body frame, and a steering detector to detect a direction of steering of the front wheel. When a vehicle speed in a forward direction of the bicycle is zero and a steering angle of the front wheel is not zero, the motor is operable to apply, to the at least one of the front wheel or the rear wheel, a torque to maintain the roll angle of the vehicle-body frame based on the direction of steering detected by the steering detector and the at least one of the roll angle or the roll angular velocity of the vehicle-body frame of the bicycle detected by the roll detector.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
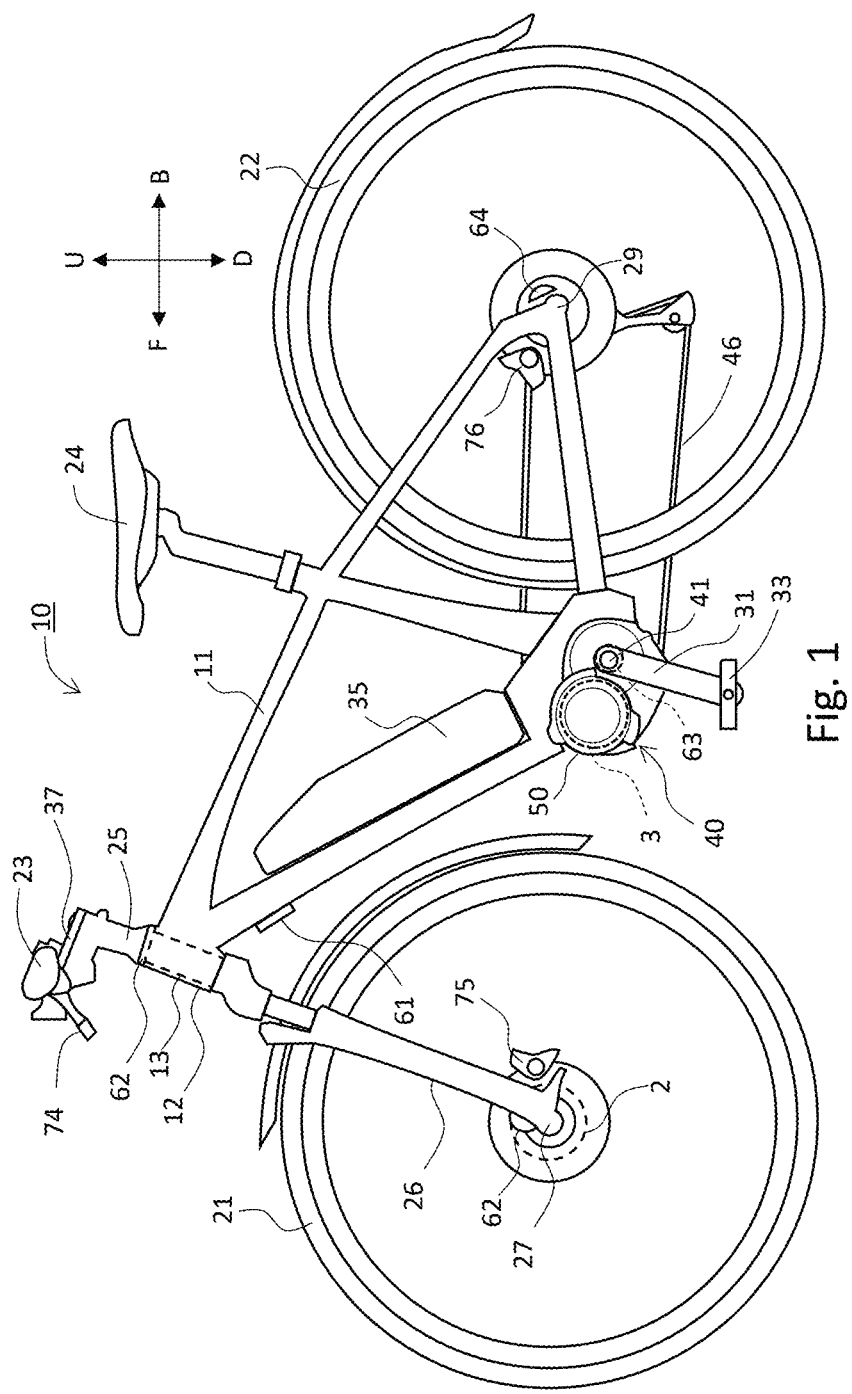
FIG. 1 is a left-side view of a bicycle according to a preferred embodiment of the present invention.

The inventors of preferred embodiments of the present invention created systems to assist a rider riding a bicycle to control the attitude in the roll direction while the bicycle is not traveling and the rider has their feet on the pedals. During their research, the inventors carefully observed the behavior of the rider, with their feet on the pedals, trying to control the attitude in the roll direction while the vehicle is not traveling. The inventors discovered that the rider, while holding the handlebars toward the left or right, is often successful in preventing the bicycle from overturning toward the left or right, i.e., in the roll direction, by applying to the pedals a small pedaling force that does not cause the bicycle to travel forward and, at the same time, slightly adjusting the pedaling force.

From further close observation, the inventors discovered that the rider makes it easier to maintain the attitude in the roll direction while the bicycle is not traveling by performing the following operations. For example, when the front wheel is steered toward the left and the bicycle is about to tilt toward the left, the rider moves the bicycle. This generates a moment in a direction that causes the bicycle to lift toward the right. As a result, the attitude of the bicycle in the roll direction is maintained. When the front wheel is steered toward the left and the bicycle is about to tilt toward the right, the rider moves, with a jerk, the center of gravity rearward so that the bicycle moves rearward. This generates a moment that causes the bicycle to lift toward the left. As a result, the attitude of the bicycle in the roll direction is maintained.

Similarly, when the front wheel is steered toward the right and the bicycle is about to tilt toward the right, the rider causes the bicycle to move forward. And when the bicycle is about to tilt toward the left, the rider causes the bicycle to move rearward. Thus, the attitude of the bicycle in the roll direction is maintained.

The inventors discovered that the rider, after repeatedly practicing the above-described operations of moving the bicycle forward and rearward to control the attitude, becomes better able to maintain the attitude of the bicycle in the roll direction with their feet on the pedals while the bicycle is not traveling. The inventors observed a skilled rider performing the above-described operations, and discovered that the rider often notices that the bicycle is about to tilt toward to the right or left at an early stage and then quickly reacts, thus successfully maintaining the attitude in the roll direction. Further, the inventors discovered that a beginner, while being able to quickly move the bicycle forward, needs a certain amount of practice to move the bicycle rearward quickly.

Based on the above, the inventors discovered that, when the bicycle is not traveling and the front wheel is steered to the right or left, the general direction of steering and the roll angle or roll angular velocity may be detected and, based on this information, the motor may apply, to a wheel, at least a torque that causes the bicycle to move rearward. The inventors discovered that this effectively assists the rider in controlling the attitude in the roll direction while the vehicle is not traveling, helping the rider to be better able to control the bicycle in the roll direction. Preferred embodiments of the present invention described below are based on these discoveries.

A bicycle according to a preferred embodiment of the present invention includes a vehicle-body frame, a front wheel rotatably supported by the vehicle-body frame and that is a steered wheel, a rear wheel rotatably supported by the vehicle-body frame, a crankshaft rotatably supported by the vehicle-body frame, a pedal connected to the crankshaft to rotate together with the crankshaft, a transmission to transmit rotation of the pedal to the rear wheel, a motor to apply at least a torque to cause rearward rotation of at least one of the front wheel or the rear wheel, a roll detector to detect at least one of a roll angle or a roll angular velocity of the vehicle-body frame, and a steering detector to detect a direction of steering of the front wheel. When a vehicle speed in a forward direction of the bicycle is zero and a steering angle of the front wheel is not zero, the motor applies, to the at least one of the front wheel or the rear wheel, a torque to maintain the roll angle of the vehicle-body frame based on the direction of steering detected by the steering detector and the at least one of the roll angle or the roll angular velocity of the vehicle-body frame of the bicycle detected by the roll detector.

In the above-described arrangement, when the vehicle speed is zero and the steering angle of the front wheel is not zero, the motor applies at least a torque to cause rearward rotation of at least one of the front wheel or the rear wheel based on the direction of the detected steering and on the detected roll angle or roll angular velocity. This effectively assists the rider, when the vehicle is not traveling, to control the behavior of the bicycle in the roll direction by placing their feet on the pedals and applying a small pedaling force. For example, when the bicycle is about to tilt toward the right or the left, the roll detector detects this and the motor applies a torque to maintain the attitude in the roll direction depending on the direction of steering. Particularly, since the operation of applying a torque to cause rearward rotation is assigned to the motor, it is possible to react to a small change of the bicycle in the roll direction and quickly apply, to a wheel, a torque that causes the bicycle to move rearward. In this case, the rider is able to concentrate on the operation of slightly adjusting the pedaling force to adjust the torque to cause forward rotation. This helps the rider to better control the attitude in the roll direction. Thus, while the vehicle is not traveling, the above-described arrangement assists the rider to control the attitude in the roll direction while having their feet on the pedals.

When the vehicle speed in the forward direction of the bicycle is zero, the bicycle is neither traveling forward nor rearward, i.e., is not traveling. According to preferred embodiments of the present invention, a torque to cause forward or rearward rotation is applied to the vehicle wheel to control the attitude in the roll direction while the vehicle is not traveling such that the bicycle may slightly move forward or rearward. Such a state with a small forward or rearward movement accompanying roll control while the vehicle is not traveling will be treated as a state with a vehicle speed of zero.

A state where the steering angle of the front wheel is not zero is a state where the front wheel is steered to the right or left. "State where the steering angle of the front wheel is zero" includes a state where the steering angle is exactly zero and a state where the steering angle is close to zero to a degree that allows the angle to be treated as zero for the purposes of roll control.

The direction of steering detected by the steering detector may be information indicating whether the steering is toward the right or the left, for example. That is, the motor applies, to at least one of the front wheel or the rear wheel, a torque to maintain the roll angle based on at least one of the indication of steering to the right or the left and the roll angle or roll angular velocity. The steering detector may be a sensor that detects the steering angle. Alternatively, the steering detector may include a sensor to detect the direction of steering, i.e., whether the steering is toward the right or the left, without detecting the steering angle.

For example, the condition for the motor to initiate the operation of applying the torque to maintain the roll angle may be that the vehicle speed in the forward direction of the bicycle is zero and the steering angle of the front wheel is not zero. The motor's operation of applying the torque to maintain the roll angle may be performed when the vehicle speed is not zero. That is, the motor may apply the torque to maintain the roll angle not only when the vehicle speed is zero and the steering angle of the front wheel is zero, but also when the vehicle speed is not zero (e.g., the vehicle is traveling at low speed).

Further, when the steering angle is zero, the motor may not apply a torque to the vehicle wheel, or the motor may apply a torque to the vehicle wheel.

The motor's operation of applying the torque to maintain the roll angle may be performed for at least a portion of the period of time when the vehicle speed is zero and the steering angle of the front wheel is not zero. For example, a portion of this period may include a sub-period when the motor does not apply a torque to the front wheel nor to the rear wheel.

The bicycle may be configured such that, when the vehicle speed of the bicycle in the forward direction is zero and the steering angle of the front wheel is not zero, a composite torque including (a) torque to cause forward rotation generated by pedaling force on the pedal by the rider transmitted to the rear wheel via the transmission, and (b) a torque applied by the motor to the at least one of the front wheel or the rear wheel contributes to a change in the roll angle of the vehicle-body frame. In this arrangement, the bicycle is configured such that torque applied by the motor to at least one of the front wheel or the rear wheel and a torque applied by the rider to the rear wheel through the pedals are synthesized to provide the composite torque, which is used to generate a moment in the roll direction of the vehicle-body frame of the bicycle. Thus, for example, a torque to cause rearward rotation applied by the motor may be adjusted relative to a torque to cause forward rotation of the rear wheel caused by pedaling force on the pedal to effectively assist the rider in controlling the roll angle using a small pedaling force while the vehicle is not traveling.

The motor's operation of applying the torque to maintain the roll angle means that, in response to the detected direction of steering and to the movement of the roll angle, the motor applies a torque to at least one of the front wheel or the rear wheel to control the roll moment of the bicycle and, as a result, reduce movements in the roll direction of the vehicle-body frame of the bicycle which is not traveling, thus maintaining the roll angle. As the motor applies the torque depending on small movements of the roll angle caused by a small pedaling force of the rider while the vehicle is not traveling, a composite torque of torque from the pedaling force of the rider and torque of the motor generate a moment in the roll direction to maintain the roll angle.

As used herein, "the motor applying the torque to maintain the roll angle" means an operation in which "when a vehicle speed in a forward direction of the bicycle is zero and a steering angle of the front wheel is not zero, the motor applies, to the at least one of the front wheel or the rear wheel, a torque to maintain the roll angle of the vehicle-body frame based on the detected direction of steering by the steering detector and the at least one of the roll angle or the roll angular velocity of the vehicle-body frame of the bicycle detected by the roll detector", described above. An example of such an operation is an operation of the motor via a standing still assist control (i.e., a standing still assist operation), described in further detail below.

It will be understood that the pedaling force of the rider need not be relied upon to determine a torque of the motor to maintain the roll angle. For example, the bicycle need not include a torque sensor to detect the rider's pedaling force on the pedals. Alternatively, even in implementations where the bicycle includes a torque sensor to detect a pedaling force, the pedaling force detected by the torque sensor need not be relied upon to determine a torque of the motor to maintain the roll angle while the vehicle is not traveling.

Arrangements where the motor applies at least a torque to cause rearward rotation of at least one of the front wheel or the rear wheel include arrangements where the motor applies a torque to cause rearward rotation of the front wheel, arrangements where the motor applies a torque to cause rearward rotation of the rear wheel, arrangements where the motor applies a torque to cause forward rotation and a torque to cause rearward rotation of one of the front wheel or the rear wheel, arrangements where the motor applies a torque to cause rearward rotation of the front wheel and a torque to cause forward rotation of the rear wheel, arrangements where the motor applies a torque to cause forward rotation of the front wheel and a torque to cause rearward rotation of the rear wheel, or arrangements where the motor applies both a torque to cause forward rotation and a torque to cause rearward rotation of each of the front and rear wheels.

The motor may apply the torque to maintain the roll angle when the steering angle of the front wheel satisfies a first steering-angle condition. Thus, the motor may perform the assist operation through roll attitude control when the steering angle is suitable for motor control. For example, conditions for the motor to initiate the operation of applying the torque to maintain the roll angle may include the steering angle of the front wheel satisfying the first steering-angle condition.

The steering detector may be a steering-angle sensor to detect the steering angle of the front wheel, for example. Alternatively, the bicycle may be provided with a steering-angle sensor separate from the steering detector. The steering angle of the front wheel is detected by the steering-angle sensor provided on the bicycle, for example.

The first steering-angle condition may be, for example, the steering angle being within a predetermined application range. In such implementations, the application range of steering angle may be defined by at least one of lower or upper limits of the steering angle. For example, the motor may perform the assist operation through roll attitude control when the steering angle of the front wheel (i.e., steering angle toward the left or steering angle toward the right) is not lower than a threshold. It will be understood that the bicycle may be configured such that the motor does not perform the operation of applying the torque to maintain the roll angle if the steering angle does not satisfy the first steering-angle condition.

The motor may apply the torque to maintain the roll angle when the vehicle speed satisfies a first vehicle-speed condition. Thus, the motor may perform the assist operation through roll attitude control when the vehicle speed is suitable for motor control. For example, conditions for the motor to initiate the operation of applying the torque to maintain the roll angle may include the vehicle speed satisfying the first vehicle-speed condition.

Vehicle speed may be detected by a vehicle-speed sensor provided on the bicycle, for example. Vehicle speed may be detected based on the velocity of the bicycle relative to the ground, or the rotational speed of the front or rear wheel, for example.

The first vehicle-speed condition may be, for example, the vehicle speed being within a predetermined application range. In such implementations, the application range of the vehicle speed may be defined by at least one of lower or upper limits for vehicle speed. For example, the motor may perform the assist operation through roll attitude control when the vehicle speed is zero or the vehicle speed is in a low-speed range including zero. It will be understood that the bicycle may be configured such that the motor does not perform the operation of applying the torque to maintain the roll angle if the vehicle speed does not satisfy the first vehicle-speed condition.

It will be understood that the motor may perform the operation of applying the torque to maintain the roll angle when the vehicle speed satisfies the first vehicle-speed condition and the steering angle satisfies the first steering-angle condition. For example, conditions for the motor to initiate the operation of applying the torque to maintain the roll angle may include both the first vehicle-speed condition and the first steering-angle condition. Further, the initiation conditions are not limited to vehicle speed and steering angle. For example, initiation conditions may include at least one of the rotation of the pedals, the rotation of the crankshaft, roll angle, roll angular velocity, the inclination angle of the bicycle in the bicycle's front-rear direction, or the rider's input operation on the input provided on the bicycle.

The motor may be a hub motor mounted on a hub of the at least one of the front wheel or the rear wheel. Thus, a simple arrangement may be used to assist the rider, having their feet on the pedals, in controlling the attitude in the roll direction while the vehicle is not traveling. For example, a hub motor may be provided on at least one of the front wheel or the rear wheel to apply both a torque to cause forward rotation and a torque to cause rearward rotation. Alternatively, each of the front and rear wheels may be provided with a hub motor. In such implementations, the bicycle may be configured such that one of the hub motors of the front wheel or the rear wheel applies a torque to cause forward rotation, whereas the other hub motor applies a torque to cause rearward rotation. Alternatively, each of the front and rear wheels may be provided with a hub motor to apply both a torque to cause forward rotation and a torque to cause rearward rotation. Alternatively, a hub motor to cause rearward rotation may be provided on the front wheel whereas a motor that applies a torque to cause forward rotation of the rear wheel may be provided on a drive unit mounted on the vehicle-body frame.

The bicycle may further include a notifier to notify a rider that the motor is applying the torque to maintain the roll angle. This allows the rider to know that the bicycle is performing the assist function through attitude control in the roll direction while the vehicle is not traveling. The notifier may be, for example, a light, a display, or a speaker mounted on the bicycle.

The motor may apply the torque to maintain the roll angle when an inclination angle of a front-rear direction of the bicycle satisfies a first inclination-angle condition. Thus, the motor may perform the assist operation through roll attitude control when the inclination of the front-rear direction of the bicycle is suitable for motor control. For example, conditions for the motor to initiate the operation of applying the torque to maintain the roll angle may include the inclination angle of the front-rear direction of the bicycle satisfying the first inclination-angle condition. Inclination angle of the front-rear direction means the angle of the front-rear axis of the vehicle-body frame relative to the horizontal plane. If the front-rear axis of the vehicle-body frame is in a horizontal direction, the inclination angle of the front-rear direction is 0°. The inclination angle of the front-rear direction is detected by a front-rear inclination sensor (e.g., a pitch detector) provided on the bicycle, for example. The front-rear pitch detector may be integrated with the roll detector, for example.

The first inclination-angle condition may be, for example, the inclination angle of the front-rear direction being within a predetermined application range. In such implementations, the application range of inclination angle may be defined by at least one of lower or upper limits of the inclination angle. For example, the motor may perform the assist operation through roll attitude control when the absolute value of the inclination angle is smaller than a threshold. The bicycle may be configured such that the motor does not perform the operation of applying the torque to maintain the roll angle if the inclination angle does not satisfy the first inclination-angle condition.

The torque of the motor may be controlled such that the torque to cause rearward rotation applied by the motor to maintain the roll angle is smaller when the bicycle is on a sloped surface that causes rear portions of the bicycle to be located lower than forward portions than when the bicycle is on a horizontal surface. This reduces the torque of the motor to cause rearward rotation when the bicycle is on an uphill slope.

The torque of the motor may be controlled such that the torque to cause rearward rotation applied by the motor to maintain the roll angle is larger when the bicycle is on a sloped surface that causes rear portions of the bicycle to be located higher than forward portions than when the bicycle is on a horizontal surface. This increases the torque of the motor to cause rearward rotation when the bicycle is on a downhill slope.

The torque to cause rearward rotation applied by the motor to maintain the roll angle may be limited to a range cancelable by a pedaling force of a rider while the vehicle speed in the forward direction of the bicycle is zero. This enables assisting the rider in roll angle control with an appropriate amount of motor torque when the vehicle is not traveling.

The transmission may transmit both forward rotation and rearward rotation of the rear wheel to the pedals. This provides feedback of the behavior of the motor to the rider through rotation of the pedals.

Application by the motor of the torque to maintain the roll angle may be disabled based on at least one of rotation of the pedals, rotation of the crankshaft, the vehicle speed, the steering angle of the front wheel, the roll angle or roll angular velocity of the vehicle-body frame, an inclination angle of the front-rear direction of the bicycle, or an input operation by the rider on an input provided on the bicycle. This enables assisting the rider in attitude control in the roll direction in the appropriate timing depending on the state of the bicycle.

The motor may be settable to always produce a torque to cause rearward rotation to be applied to maintain the roll angle based on an input operation by the rider on an input provided on the bicycle. As the motor always applies a torque to cause rearward rotation, the rider is able to easily control the attitude in the roll direction by adjusting the torque to cause forward rotation with the pedaling force on the pedals.

At least one of a determination as to whether the motor is to apply the torque to maintain the roll angle or an amount of control of the torque to maintain the roll angle applied by the motor may be specifiable by an input operation by the rider on an input provided on the bicycle. This enables the rider, through the input, to indicate whether the motor's assist operation in roll control should occur while the vehicle is not traveling, or the amount of control that should accompany this operation.

When the vehicle speed in the forward direction of the bicycle is zero and the steering angle of the front wheel is not zero, the motor may be controlled to apply a torque to cause forward rotation of the at least one of the front wheel or the rear wheel when the vehicle-body frame is about to tilt toward a direction to which the front wheel is steered, and the motor may be controlled to apply torque to cause rearward rotation of the at least one of the front wheel or the rear wheel when the vehicle-body frame is about to tilt toward a direction opposite to the direction to which the front wheel is steered. The motor's operation through such control is one example of the motor applying the torque to maintain the roll angle. This enables efficiently controlling a moment in the roll direction of the bicycle and assisting the rider in controlling the attitude in the roll direction when the vehicle is not traveling.

When the vehicle speed in the forward direction of the bicycle is zero and the steering angle of the front wheel is not zero, the motor may, in response to an initiation of a change in the roll angle from a state where the vehicle-body frame is in an upright position and the roll angle is not changing, apply, to the at least one of the front wheel or the rear wheel, a torque in a direction that cancels the change in the roll angle. This operation of the motor is an example of the motor applying the torque to maintain the roll angle.

Thus, when the vehicle is not traveling and the rider is balancing in an upright position with almost no movements in the roll direction and, from this state, the vehicle-body frame starts to move in the roll direction, then, the motor is able to apply a torque that cancels this movement at its early stage. This reduces the torque of the motor required to maintain the attitude in the roll direction.

"State where the vehicle-body frame is in an upright position and the roll angle is not changing" includes not only a case where the roll angle detected by the sensor indicates the exact upright position and the roll angular velocity is zero, but also a case where the displacement in the roll angle from the upright position and the roll angular velocity are so small that the rider feels being in an upright position and feels no movement in the roll direction.

The torque applied by the motor to maintain the roll angle may be determined upon based on both the roll angle and the roll angular velocity. For example, the motor's operation of applying the torque to maintain the roll angle may involve determining a target roll angular velocity based on the difference between the roll angle detected by the roll detector and a reference value, determining a torque based on the difference between the detected target roll angular velocity and roll angular velocity, and the motor applying, to at least one the front wheel or the rear wheel, the torque determined based on the target roll angular velocity. The reference value may be, for example, predetermined or settable by the rider, or may be dynamically set depending on the state of the bicycle. The reference value may be, for example, a value indicating the target roll state (e.g., target roll angle) that should be maintained while the vehicle is not traveling. The reference value may be a value for the upright position, for example. The difference between the detected roll angle and the reference value may include both the direction of displacement of the roll angle from the reference value and the amount of displacement, or may include only the direction of displacement. The difference between the detected roll angular velocity and the target roll angular velocity may include both the direction of displacement of the roll angular velocity from the target and the amount of displacement, or may include only the direction of displacement.

Preferred embodiments of the present invention also include a motor controller configured or programmed to cause the motor to perform the operation of applying the torque to maintain the roll angle, a method of controlling the motor, and a program to control the motor or a non-transitory storage medium storing such a program. The motor controller may include a processor or an electronic circuit programmed or configured to cause the motor to perform the operation of applying the torque to maintain the roll angle.

Now, bicycles according to preferred embodiments of the present invention will be described with reference to the drawings. In the drawings, the same or corresponding elements are labeled with the same reference numerals, and their description will not be repeated. Further, the sizes of the components in the drawings do not exactly represent the sizes of the actual components, the size ratios between the components, or the like. In the description provided below, the directions "front/forward" and "rear(ward)", "left" and "right", and "top/up(ward)" and "bottom/down(ward)" of the bicycle mean such directions as perceived by a rider sitting on the saddle (i.e., seat 24) and gripping the handlebars 23. The directions "front/forward" and "rear(ward)", "left" and "right", and "top/up(ward)" and "bottom/down (ward)" of the bicycle are the same as such directions of the vehicle-body frame of the bicycle. Furthermore, the forward direction of the bicycle is the same as the front-rear direction of the bicycle. The preferred embodiments described below are merely illustrative, and the present invention is not limited to the preferred embodiments described below.

The roll angle of the vehicle-body frame of the bicycle is determined where the roll angle for the upright position is zero and the absolute value of roll angle increases as the vehicle-body frame tilts toward the right or left. Upright position means that the top-bottom axis of the vehicle-body frame is aligned with the vertical direction (i.e., direction of gravity). The vehicle-body frame tilting from the upright position in the roll direction (i.e., left-right direction) means the top-bottom axis of the vehicle body tilting toward the left or right from the direction of gravity.

FIG. 1 is a left side view of a bicycle 10 according to a preferred embodiment of the present invention. The characters F, B, U, and D in FIG. 1 indicate forward, rearward, upward, and downward, respectively.

As shown in FIG. 1, the bicycle 10 includes a vehicle-body frame 11. The vehicle-body frame 11 extends in the front-rear direction. The vehicle-body frame 11 includes a head pipe 12 located toward the front. The head pipe 12 rotatably supports a steering shaft 13. Handlebars 23 are attached to the top of the steering shaft 13, and a front fork 26 is attached to the bottom of the shaft. The front fork 26 rotatably supports a front wheel 21 at its lower end. A rear portion of the vehicle-body frame 11 rotatably supports a rear wheel. A seat 24 is attached to an upper portion of the vehicle-body frame 11. The vehicle-body frame 11 rotatably supports a crankshaft 41 located toward its bottom. Brake levers 74 are attached to locations on the handlebars 23 toward the left and right. The left brake lever 74 is used to operate a brake 76 for the rear wheel 22. The right brake lever 74 is used to operate a brake 75 for the front wheel 21.

In the implementation shown in FIG. 1, a drive unit 40 is attached to a lower portion of the vehicle-body frame 11. The crankshaft 41 is rotatably attached to the drive unit 40. Thus, the crankshaft 41 may be rotatably supported by the vehicle-body frame 11 with the drive unit 40 provided in between. It will be understood that the drive unit 40 may be omitted. In such implementations, the crankshaft 41 may be rotatably attached to a lower portion of the vehicle-body frame 11. The drive unit 40 includes a housing 50 and a center motor 3 contained in the housing 50.

The crankshaft 41 extends in the left-right direction of the bicycle. Crank arms 31 are attached to the respective ends of the crankshaft 41. Pedals 33 are attached to the distal ends of the respective crank arms 31. Although not shown, the bicycle 10 is provided with a driving sprocket that rotates together with the crankshaft 41 and a driven sprocket that rotates together with the rear wheel 22. A chain 46 is wound around the driving and driven sprockets to connect them. It will be understood that the chain 46 may be replaced by a belt. The driving sprocket, chain 46, and driven sprocket are examples of transmission members that transmit rotation of the pedals to the rear wheel. The transmission members are not limited to these examples. For example, the sprockets and chain may be replaced with gears and shafts. Further, the transmission members may include a one-way clutch. The one-way clutch transmits forward rotation, and does not transmit rearward rotation.

In the implementation shown in FIG. 1, the hub of the front wheel 21 is provided with a motor 2. The motor 2 applies, to the front wheel, a torque that rotates the front wheel 21 about an axle 27. By way of example, the motor 2 is an in-wheel motor incorporated in the hub (i.e., hub motor). The motor 2 may include, for example, a rotor and a stator. The axis of rotation of the rotor may be coaxial with the axle 27. The hub may be provided with a gear that transmits rotation of the motor 2 to the vehicle wheel (i.e., front wheel 21). The gear may be a planetary gear, for example. Further, a one-way clutch may be provided in the path of transmission of rotation from the motor 2 to the vehicle wheel (i.e., front wheel 21).

The bicycle 10 includes a roll detection unit 61. The roll detection unit 61 is a sensor that detects at least one of the roll angle or roll angular velocity of the vehicle-body frame 11. The roll detection unit 61 is mounted on the vehicle-body frame 11, for example. The roll detection unit 61 may include, for example, an angular velocity sensor (i.e., gyro-sensor) that detects the angular velocity of the vehicle-body frame 11 (i.e., vehicle body) in the roll direction. Alternatively, the roll detection unit 61 may include an acceleration sensor that detects the acceleration of the vehicle-body frame 11 (i.e., vehicle body). Alternatively, the roll detection unit 61 may include a 6-axis sensor that includes an angular velocity sensor and an acceleration sensor. The roll detection unit 61 is fixed to the vehicle-body frame 11. Mounting of the roll detection unit 61 is not limited to any particularly location. For example, other than on the vehicle-body frame 11, the roll detection unit 61 may be mounted on the front wheel 21, rear wheel 22, steering shaft 13, seat 24, or drive unit 40. Further, the roll detection unit 61 may be contained in the drive unit 40.

The bicycle 10 includes a steering detection unit 62 that detects the general direction of steering. The steering detection unit 62 may include a steering-angle sensor, for example. Alternatively, the steering detection unit 62 may include a sensor that detects the general direction of steering (i.e., to the right or left) but does not detect the steering angle. The steering detection unit 62 is mounted on the head pipe 12 (i.e., vehicle-body frame 11), for example. The steering detection unit 62 detects rotation of the steering shaft 13 relative to the vehicle-body frame 11. The steering detection unit 62 may detect rotation of the steering shaft 13 by detecting rotation of the handlebars 23, front fork, or front wheel 21 relative to the vehicle-body frame 11.

A torque sensor 63 is provided around the crankshaft 41 to detect the rider's pedaling force. The torque sensor 63 detects a torque that rotates the crankshaft 41 about its axis. The torque sensor 62 may include, for example, a non-contact torque sensor such as a magnetostrictive one, or a contact torque sensor such as an elastic-body variable detection-type one. A magnetostrictive torque sensor includes a magnetostrictive member able to produce magnetostrictive effects that receives a rotational force of the crankshaft, and a detection coil that detects a change in magnetic permeability caused by a force from the magnetostrictive member.

The bicycle 10 includes a vehicle-speed sensor (i.e., speed sensor) 64 that detects rotation of the rear wheel 22. The vehicle-speed sensor 64 includes, for example, a detected element that rotates together with the rear wheel 22, and a detecting element fixed to the vehicle-body frame 11 to detect rotation of the detected element. The detecting element detects the detected element in a mechanical, magnetic, or optical manner. The vehicle-speed sensor 64 may detect rotation of a rotating body other than the rear wheel 22 that rotates as the bicycle 10 advances, such as the front wheel 21, motor 3, crankshaft 41, transmission gear, or chain, for example.

Although not shown, the bicycle 10 may include a crankshaft-rotation sensor that detects rotation of the crankshaft 41. The crankshaft-rotation sensor includes, for example, a detected element that rotates together with the crankshaft 41, and a detecting element fixed to the vehicle-body frame 11 to detect rotation of the detected element. The detecting element is able to detect the detected element in a mechanical, optical, or magnetic manner.

Although not shown, the bicycle 10 includes a motor controller that controls the motor 2 and the center motor 3. For example, the motor controller may include electronic devices mounted on a board within the housing 50 of the drive unit 40. The electronic devices may include, for example, a processor or an electronic circuit. The motor controller is electrically connected to the roll detection unit 51, steering detection unit 62, torque sensor 63, vehicle-speed sensor 64, motor 2, and center motor 3. These components may be connected by a cable, or may be wirelessly connected.

The bicycle 10 includes a battery unit 35. The battery unit 35 supplies electric power to the motor 2 on the hub of the front wheel 21 and the motor 3 of the drive unit 40. The battery unit 35 includes a battery and a battery controller, not shown. The battery is a chargeable battery able to be charged and discharged. The battery controller controls the charging and discharging of the battery and, at the same time, monitors output current, remaining capacity, and other information about the battery. The battery unit 35 may be positioned on the vehicle-body frame 11, for example.

The handlebars 23 are provided with a display device 37. The display device 37 includes, for example, a display and buttons to receive user operations, or an input device such as a touch screen. The display device 37 displays various information relating to the bicycle 10. In some implementations, the display device 37 may be omitted. Further, in addition to the display device 37 or in lieu of the display device 37, a light (i.e., lamp), speaker or the like may be provided as a notification unit to notify information to the rider. Further, separate from the display device 37, an input device such as a switch or lever may be provided on the handlebar 23.

The bicycle 10 may include a gearshift mechanism. The gearshift mechanism changes the gear ratio in response to a rider operation of a gearshift operation device. The gearshift operation device may be mounted on the handlebars 23, for example. The gearshift mechanism may be provided by at least one of the driving sprocket or driven sprocket that may be a multi-gear sprocket, for example. The multi-gear sprocket, around which the chain 46 is wound, enables switching in response to a rider operation of the gearshift operation device. The gearshift mechanism may be such an external gearshift, or may be an internal gearshift.

Figure 2:
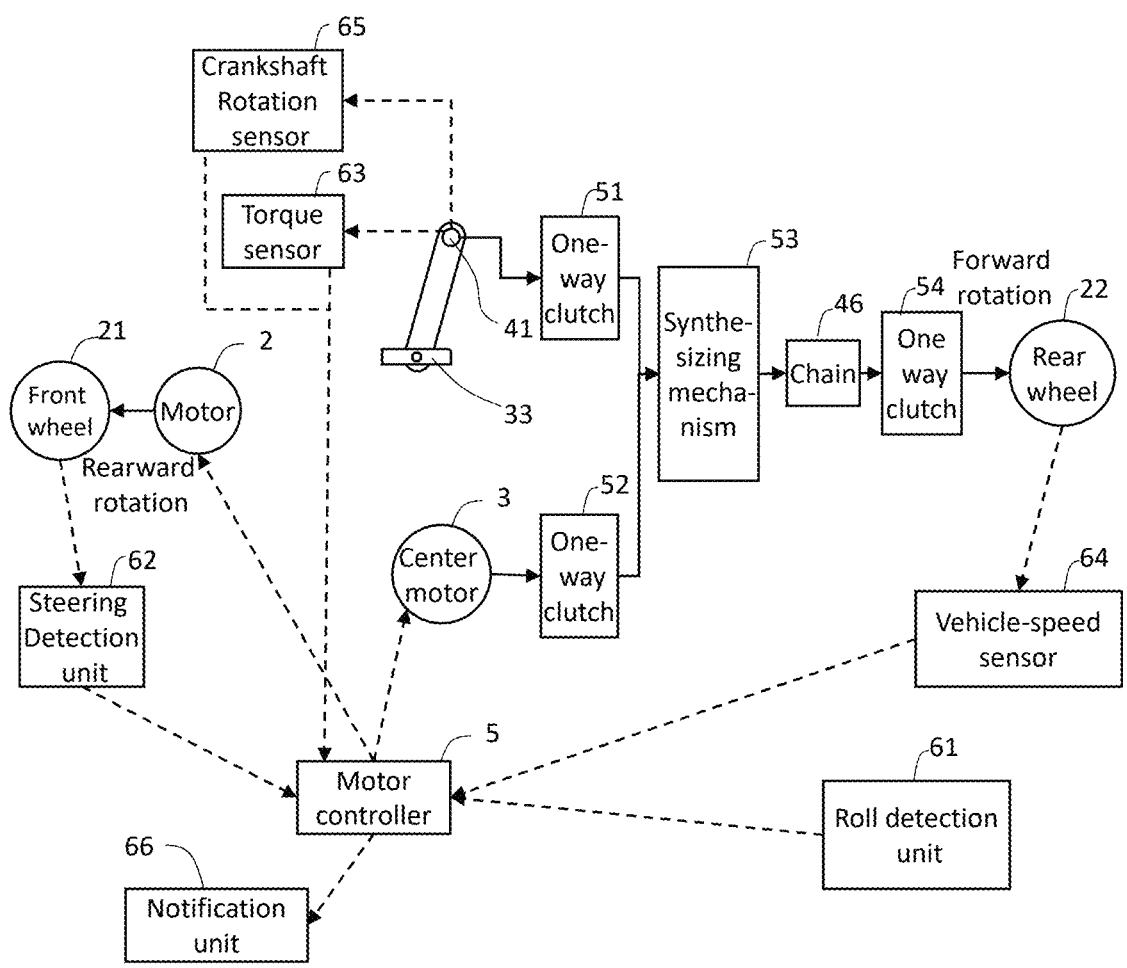
FIG. 2 is a block diagram of an exemplary configuration of a bicycle according to a preferred embodiment of the present invention.

FIG. 2 is a block diagram of an exemplary configuration of the bicycle 10 according to a preferred embodiment of the present invention. In the implementation shown in FIG. 2, a synthesizing mechanism 53 is provided to synthesize rotation of the crankshaft 41 and rotation of the center motor 3. A one-way clutch 51 is provided between the crankshaft 41 and synthesizing mechanism 53. A one-way clutch 52 is provided between the center motor 3 and synthesizing mechanism 53.

The synthesizing mechanism includes a cylindrical member, for example. The crankshaft 41 is positioned inside the cylindrical member. The driving sprocket (not shown) is attached to the synthesizing mechanism. The synthesizing mechanism rotates, for example, about the same axis of rotation as for the crankshaft 41 and driving sprocket. It will be understood that the synthesizing mechanism is not limited to the above-described implementation. For example, the synthesizing mechanism may include an auxiliary sprocket that transmits rotation of the center motor 3 to the chain 46. In such implementations, rotation of the driving sprocket from the crankshaft and rotation of the auxiliary sprocket from the center motor 3 are synthesized and transmitted to the chain 46.

The chain 46 is wound about the driving sprocket and driven sprocket (not shown). A one-way clutch 54 is provided between the driven sprocket and rear wheel 22. Rotation of the crankshaft 41 and rotation of the center motor 3 are synthesized by the synthesizing mechanism 53 and transmitted to the rear wheel 22. It is to be noted here that the one-way clutches 51, 52, and 54 transmit forward rotation, and do not transmit rearward rotation. Thus, only forward rotation of the crankshaft 41 and center motor 3 is transmitted to the rear wheel 22, and rearward rotation is not transmitted.

The motor 2 provided on the hub of the front wheel 21 transmits rearward rotation of the front wheel 21. No one-way clutch is provided between the front wheel 21 and motor 2. A speed reducer (i.e., gear) may be provided between the front wheel 21 and motor 2.

In the implementation shown in FIG. 2, the motor controller 5 controls the motor 2 and center motor 3 based on information obtained through detection by the steering detection unit 62, roll detection unit 61, torque sensor 63, and vehicle-speed sensor 64. The motor controller 5 controls the motor 2 and center motor 3 to operate at least in an assist-travel mode and a standing still assist mode. In the assist-travel mode, the center motor 3 assists the pedaling force of the rider while the bicycle 10 is traveling. In the present implementation, the assist-travel mode is treated as the normal mode. In the standing still assist mode, the motor 2 and center motor 3 assist the rider to control the attitude in the roll direction while the bicycle 10 is not traveling.

That is, the motor controller 5 switches between travel-assist control and standing still assist control depending on the state of the bicycle 10, and performs the relevant control. This switching is performed based on the general direction of steering detected by the steering detection unit 62 and the vehicle speed detected by the vehicle-speed sensor 64, for example.

In the assist-travel mode, i.e., during travel-assist control, the motor controller 5 controls at least a torque to cause forward rotation applied to the rear wheel 22 by the center motor 3, i.e., an assist force, depending on the pedaling force detected by the torque sensor 64. It will be understood that the motor controller 5 may further use the vehicle speed detected by the vehicle-speed sensor 64 to control the assist force from the center motor 3. Further, during the travel-assist control, the motor controller 5 may control an assist force by controlling at least one of a torque to cause forward rotation applied to the rear wheel 22 by the center motor 3 or a torque to cause forward rotation applied to the front wheel by the motor 2. For example, in the assist-travel mode, the motor 2 and center motor 3 may apply a torque to cause forward rotation of both the front and rear wheels 21 and 22.

In the standing still assist mode, i.e., during the standing still assist control, the motor controller 5 controls at least one of the motor 2 or the center motor 3 based on the general direction of steering detected by the steering detection unit 62 and on at least one of the roll angle or the roll angular velocity detected by the roll detection unit 61 to generate a torque to maintain the roll angle of the vehicle-body frame 11. The notification unit 66 notifies a rider that the bicycle is in the standing-still-assist mode when the motor controller 5 is executing the standing still assist control.

By way of example, the motor controller 5 is a motor control unit (MCU). The motor controller 5 includes, for example, a processor, memory, a motor driving circuit, and a motor monitoring unit. The processor executes a program in the memory to determine how to control the motor 2 and center motor 3 for each of the travel-assist control and the standing still assist control. For example, the processor determines a command value for the motor 2 and the center motor 3. It will be understood that at least some of the functions of the processor may be implemented by a dedicated circuit separate from the processor.

To implement the functions of the motor controller 5, the processor acquires information from at least one of the steering detection unit 62, roll detection unit 61, torque sensor 63, vehicle-speed sensor 64, or crankshaft-rotation sensor 65. Based on the information acquired, the processor outputs a control signal for at least one of the motor 2 or the center motor 3. As the motor driving circuit operates in accordance with the control signal, the motor 2 or the center motor 3 is driven. The motor driving circuit may be an inverter provided on each of the motor 2 and center motor 3, for example. The battery unit 35 supplies the motor 2 and center motor 3 with an amount of electric power corresponding to the control signal from the processor. The motor 2 and center motor 3, when supplied with electric power, rotate to generate a torque under control by the motor controller 5.

The motor monitoring unit acquires values relating to the driving of the motor 2 and center motor 3, such as electric current, voltage, the number of rotations, and the rotational speeds of the motor 2 and center motor 3. The processor or motor driving circuit may use values acquired by the motor monitoring unit to perform processes or operations. The motor monitoring unit may acquire, for example, values representing the rotation of the motor, such as the number of rotations or rotational speed of the motor, from the motor-rotation sensor.

The steering detection unit 62 detects rotation of the steering shaft 13 relative to the vehicle-body frame 11, and provides a signal depending on the rotation of the motor controller 5. The steering detection unit 62 may output a signal indicating the general direction of rotation (i.e., to the right, to the left, or no rotation). Further, the steering detection unit 62 may output the steering angle. Based on the signal from the steering detection unit 62, the processor may determine a direction of rotation.

The roll detection unit 61 outputs a value or a signal indicating a change in the attitude at least in the roll direction of the vehicle body (i.e., vehicle-body frame). The vehicle body has a yaw angle, a roll angle, and a pitch angle. The roll detection unit 61 outputs, for example, the angle or angular velocity relating to at least the roll angle. If the roll detection unit 61 is a 6-axis sensor, the roll detection unit 61 outputs the yaw angular velocity, roll angular velocity, and pitch angular velocity of the vehicle body, as well as the acceleration in the front-rear direction, the acceleration in the left-right direction, and the acceleration in the top-bottom direction of the vehicle body. The roll detection unit 61 may include a circuit that calculates the roll angular velocity or roll angle from an electric signal resulting from the above detections. Alternatively, the motor controller 5 may be configured to receive a value or a signal from the roll detection unit 61 and convert them to a roll angular velocity or a roll angle.

The vehicle-speed sensor 64 detects the rotational angle of the rear wheel 22 (or another rotating body), and provides a signal depending on the rotational angle to the motor controller 5. For example, the vehicle-speed sensor 64 detects rotation of the rear wheel 22 at intervals of a predetermined angle and outputs a rectangular wave signal or a sine wave signal. The processor calculates the rotational speed of the rear wheel 22 from the output signal of the vehicle-speed sensor 64. In some arrangements, the calculation of rotational speed may be performed by the vehicle-speed sensor 64.

The torque sensor 63 generates a voltage signal with an amplitude corresponding to the magnitude of detected torque. The torque sensor 63 may include a torque calculation circuit that converts a voltage signal to a torque value. For example, the torque calculation circuit converts an analog voltage signal to a digital value by AD conversion. The magnitude of detected torque is output in the form of a digital signal. In some arrangements, the motor controller 5 may be configured to receive an analog signal from the torque sensor 63 and convert it to a digital value.

Figure 3:
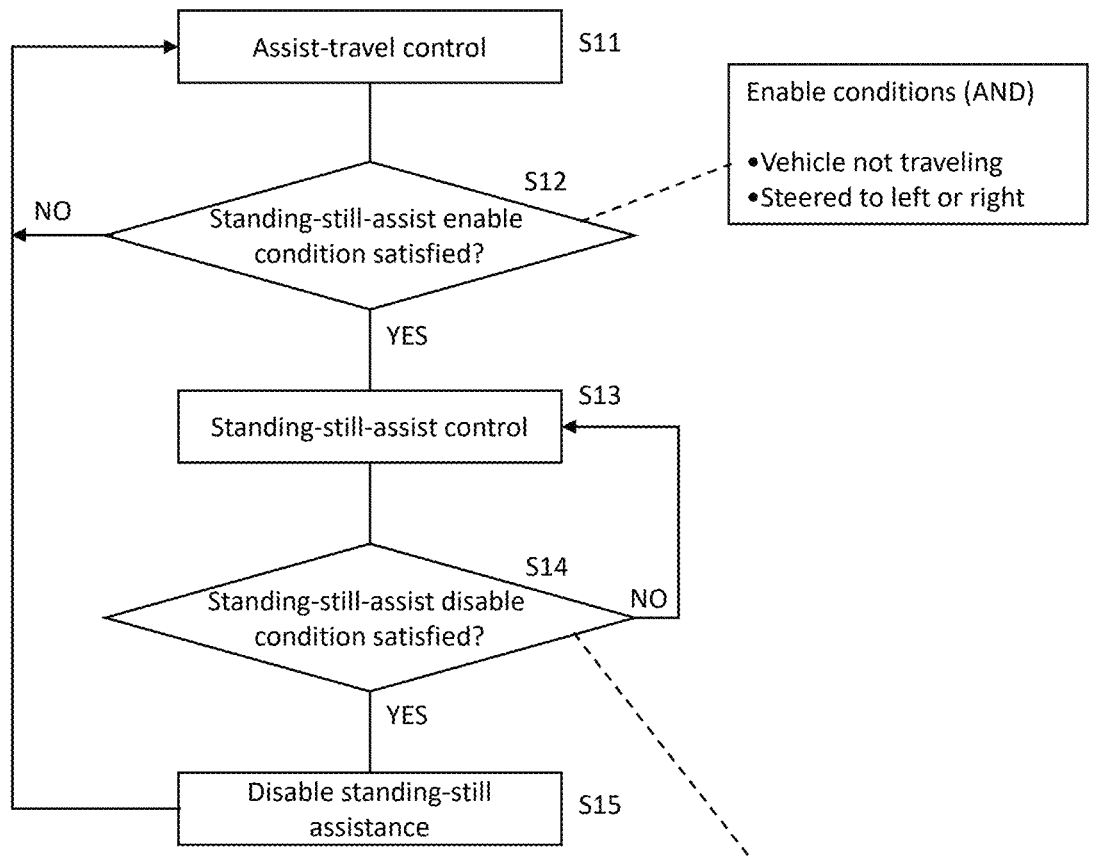
FIG. 3 is a flow chart illustrating an exemplary operation of a motor according to a preferred embodiment of the present invention.

FIG. 3 is a flow chart illustrating an exemplary motor operation according to a preferred embodiment of the present invention. In the implementation shown in FIG. 3, the motor controller 5 performs an assist-travel control in the normal mode (S11) and, when the bicycle 10 satisfies a standing still assist enable condition (YES at S12), performs a standing still assist control (S13). During the standing still assist control, when the bicycle 10 satisfies a standing still assist disable condition (YES at S14), the motor controller 5 terminates the standing still assist control and performs the assist-travel control (S11).

The standing still assist enable condition at step S12 (hereinafter simply referred to as "enable condition") may be, by way of example, the vehicle not traveling and being steered to the right or left (i.e., the steering angle being not neutral), as shown in FIG. 3.

The determination at step S12 as to whether the vehicle is not traveling may be performed based on the vehicle speed detected by the vehicle-speed sensor 64, for example. For example, the motor controller 5 may determine that the vehicle is not traveling when the vehicle speed V is lower than a first vehicle speed threshold Vth1 (V<Vth1). Alternatively, the motor controller 5 may determine that the vehicle is not traveling when the detected vehicle speed V is zero (V=0).

The determination at step S12 as to whether the condition regarding the general direction of steering is met may be performed based on the steering angle S detected by the steering detection unit 62, for example. By way of example, the condition may be the absolute value of the steering angle S exceeding a first steering-angle threshold Sth1 ($|S|>Sth1$). Alternatively, the condition may be the steering angle S being not zero (S≠0). Alternatively, the motor controller 5 may determine whether the condition regarding the general direction of steering is met based on a value indicating the general direction of steering detected by the steering detection unit 62, rather than a value of steering angle.

The enable conditions are not limited to the implementation in FIG. 3. For example, one of the two conditions shown in FIG. 3 may be omitted. Alternatively, for example, in addition to the conditions in FIG. 3, at least one of a pedaling state, a roll state, or the inclination angle of the front-rear direction may be added to the list of enable conditions. For example, enable conditions may be the vehicle not traveling, and steering angle S>Sth1, and no pedaling. No pedaling can be determined based on the number of rotations or rotational angle of the crankshaft detected by the crankshaft-rotation sensor 65, for example. By way of example, no pedaling may be determined if the number of rotations or rotational angle of the crankshaft does not exceed a threshold.

The roll state may be determined based on at least one of the roll angle or roll angular velocity detected by the roll detection unit 61. An additional enable condition may be the tilt of the vehicle-body frame 11 in the roll direction not exceeding a threshold or the amount of fluctuation of the roll angle within a predetermined period of time being within a permissible range. By way of example, an additional enable condition may be the roll angle not exceeding a threshold, neither to the right nor to the left. Alternatively, in addition to the above conditions, an additional condition may be the absolute value of the roll angular speed not exceeding a threshold. Thus, the standing still assist control is not performed if controlling roll by the motor would be ineffective, such as when the bicycle 10 is tilting significantly to the left or right or when the roll angle is changing quickly and is unstable. Further, an enable condition may be both the roll angle and roll angular velocity being lower than thresholds. Thus, the standing still assist control may be initiated when the vehicle, to some degree, is close to an upright position and is stable without movements in the roll direction.

The determination as to whether the condition regarding the inclination angle of the front-rear direction is met may be performed based on the pitch angle of the vehicle-body frame 11 detected by the roll detection unit 61, for example. In such implementations, the roll detection unit 61 may be a gyrosensor or a 6-axis sensor able to detect the pitch angular velocity. The motor controller 5 may determine the inclination angle of the front-rear direction of the bicycle 10 based on the pitch angle detected by the roll detection unit 61, for example. It will be understood that the inclination angle of the front-rear direction may be detected by an inclination sensor separate from the roll detection unit 61. When the bicycle 10 is on an uphill slope, front portions of the vehicle-body frame 11 are located higher than rear portions. When the bicycle 10 is on a downhill slope, front portions of the vehicle-body frame 11 are located lower than rear portions. In both cases, the inclination angle of the front-rear direction is not zero.

An enable condition for the motor controller 5 may be, for example, both the inclination angle of the front-rear direction when front portions of the vehicle-body frame 11 are located lower than rear portions, Pk, and the inclination angle of the front-rear direction when front portions of the vehicle-body frame 11 are located higher than rear portions, Pn, being smaller than thresholds Pk_th1 and Pn_th1 (i.e., Pk<Pk_th1 AND Pn<Pn_th1). The relationship between the thresholds may be pk_th1=Pn_th2, or Pk_th1≠Pn_th2. For example, if the relationship between the thresholds is Pk_th1<Pn_th2, the enable condition regarding inclination angle for an uphill slope may be less strict than that for a downhill slope.

At step S14, the standing still assist disable conditions (hereinafter simply referred to as "disable condition") may be, by way of example, as shown in FIG. 3: initiation of pedaling; crank rotational angle>threshold; vehicle speed>threshold; steering angle being close to neutral; roll angle or roll angular velocity>threshold; or a switching operation being performed. The motor controller 5 may determine that the disable condition is satisfied if one of them applies. The steering angle and roll angle or roll angular velocity may be determined based on results of detection by the steering detection unit 62 and roll detection unit 61.

At step S14, initiation of pedaling is determined based on the number of rotations of the crankshaft detected by the crankshaft-rotation sensor 65, for example. For example, the motor controller 5 may determine initiation of pedaling when the number of rotations of the crankshaft per unit time exceeds a threshold. The crankshaft rotational angle may be determined based on the rotational angle detected by the crankshaft-rotation sensor 65. For example, it may be determined that the disable condition is satisfied if the rotational angle of the crankshaft exceeds a threshold (e.g., one rotation (360°)). Thus, if the disable conditions are initiation of pedaling and rotation of the crankshaft, the rider starting to pedal to move the bicycle 10 forward triggers automatic disablement of the standing still assist control.

If the disable condition at step S14 is vehicle speed>threshold, the bicycle 10 exiting the non-traveling state and starting to travel triggers automatic disablement of the standing still assist control. In such implementations, the threshold may be substantially equal to the speed at which a person walks, for example.

If the disable condition at step S14 is the steering angle being close to neutral, it is possible to avoid ineffective standing still assist control when the torque of the vehicle wheel is unlikely to produce a torque in the roll direction. Further, the rider steering to the neutral state (i.e., state with no steering toward the right or left) triggers automatic disablement of the standing still assist control.

If the disable condition at step S14 is roll angle or roll angular velocity>threshold, the amount of motor control can be prevented from being excessive when the vehicle-body frame excessively tilts to the right or left.

At step S14, the switching operation may be the rider's operation of a switch provided on the handlebars 23, for example. For example, if the switch is depressed during standing still assist control, the motor controller 5 may disable the standing still assist control. This allows the rider to disable the standing still assist control at their own will.

It will be understood that the disable conditions are not limited to the implementation shown in FIG. 3. For example, at least one of the conditions shown in FIG. 3 may be omitted. Further, in addition to these conditions, additional conditions may be provided.

Figure 4:
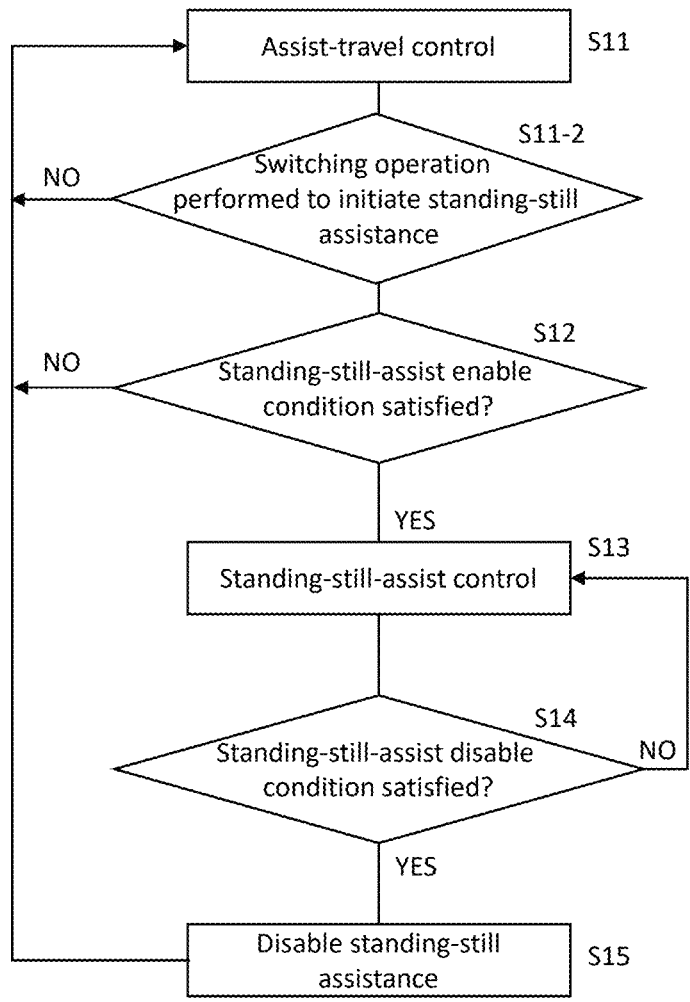
FIG. 4 is a flow chart illustrating a variation of an operation of a motor according to a preferred embodiment of the present invention.

FIG. 4 is a flow chart illustrating a variation of the operation of the motor according to a preferred embodiment of the present invention. In the implementation shown in FIG. 4, when the rider performs a switching operation to initiate standing-still assistance (YES at S11-2), it is determined whether the enable condition is met (S12); if the enable condition is satisfied, the standing still assist control (S13) is performed. That is, the standing still assist control is not performed if the rider does not perform the switching operation. This allows the rider to control the enablement/disablement of the standing still assist control. For example, an input device provided on the bicycle 10 receives the rider's switching operation to switch the standing still assist control between being enabled and being disabled. It will be understood that, in FIG. 4, steps S11 and S12 to S15 may be the same processes as in FIG. 3.

In the operations shown in FIGS. 3 and 4, while the standing still assist control (S13) is being performed, the display device 37 may turn on a lamp or display on the screen a notification to that effect. This allows the rider to know the control mode. Alternatively, when the standing still assist control is initiated and disabled, the display device 37 and/or other output device may output a sound or light indicating initiation and disablement, respectively.

Figure 5:
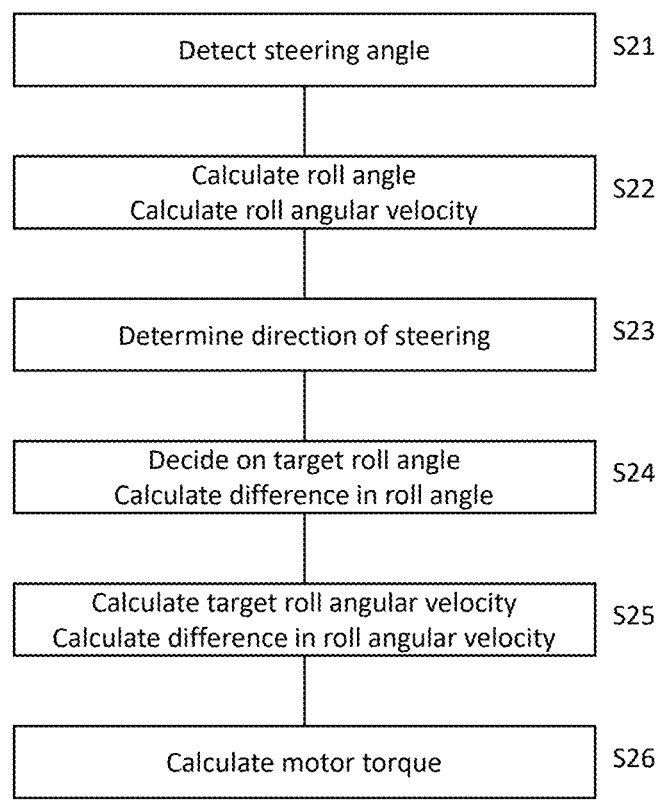
FIG. 5 is a flow chart illustrating an exemplary process of a standing still assist control.

FIG. 5 is a flow chart illustrating an exemplary process of a standing still assist control for step S13 in FIG. 4. In the implementation shown in FIG. 5, the motor controller 5 detects the current steering angle based on an output of the steering detection unit 62 (S21). The motor controller 5 calculates the current roll angle and roll angular velocity based on the output of the roll detection unit 61 (S22). Based on the steering angle detected at step S21, the motor controller 5 determines the general direction of steering, i.e., whether the steering is to the left or right (S23).

The motor controller 5 determines a target roll angle and calculates the difference between the current and target roll angles (S24). The difference information may include, for example, values indicating the direction of displacement that indicates whether the current roll angle is displaced toward the right or left relative to the target roll angle, and the amount of displacement. The target roll angle may be, for example, the roll angle for the upright position (0°), the roll angle at the beginning of standing still assist control, or any other value depending on the state of the bicycle 10. Alternatively, the rider may set a target roll angle by inputting it to the input device on the bicycle 10. The target roll angle is an example of a reference value. For example, at step S24, the motor controller 5 may calculate the difference between a predetermined reference value and the current roll angle.

The motor controller 5 calculates the target roll angular velocity depending on the difference between the target roll angle (i.e., reference value) and current roll angle, and calculates the difference between the current roll angular velocity and target roll angular velocity (S25). For example, if the current roll angle is displaced toward the left relative to the target roll angle, the target roll angular velocity may be a roll angular velocity to the right; if the current roll angle is displaced toward the right relative to the target roll angle, the target roll angular velocity may be a roll angular velocity to the left. Thus, the motor controller 5 may determine a direction of the target roll angular velocity depending on the direction of displacement of the current roll angle relative to the reference value. Further, a magnitude of target roll angular velocity may be determined depending on the amount of displacement (i.e., difference) of the current roll angle relative to the reference value. It will be understood that a magnitude of target roll angular velocity may be determined based on the amount of control set by the rider by their input operation of the input device. For example, the amount of displacement of the roll angle may be adjusted depending on the set amount of control, and the resulting value may be treated as the magnitude of target roll angular velocity. Alternatively, the magnitude of target roll angular velocity may be a predetermined value.

The motor controller 5 may determine a motor torque depending on the difference between the current roll angular velocity and target roll angular velocity calculated at step S25 (S26). The motor controller 5 may determine a motor torque that will generate a roll angular velocity to bring this difference close to zero. For example, if the target roll angle is to the left of the current roll angle and the vehicle-body frame is currently moving toward the right (i.e., if the current roll angular velocity is to the right), the motor controller determines a motor torque that will generate a roll angular velocity to the left. The values of motor torque that may be determined include information about the direction of the motor torque (forward rotation or rearward rotation) and the magnitude of torque.

At step S26, the decision on a direction of motor torque is performed based on the general direction of steering determined at step S23. For example, in determining a motor torque, a torque to cause forward rotation is chosen if a roll angular velocity is to be generated in a direction opposite to the general direction of steering, i.e., a direction to which the handlebars are steered; a torque to cause rearward rotation is chosen if a roll angular velocity in the general direction of steering is to be generated. Further, at step S26, a magnitude of motor torque may be determined depending on the magnitude of target roll angular velocity.

The process shown in FIG. 5 enables controlling the motor such that the roll angle and roll angular velocity of the vehicle-body frame 11 follow their target values. The motor controller 5 causes the motor 2 or center motor 3 to output the motor torque determined at step S26. In the arrangement shown in FIG. 2, the motor controller 5 causes the motor 2 on the hub of the front wheel to output the determined motor torque if the controller has determined a torque to cause rearward rotation as the motor torque at step S26. If the controller 5 has determined a torque to cause forward rotation as the motor torque at step S26, the motor controller causes the center motor 3 to output such motor torque. Thus, a torque to maintain the roll angle at the target value is applied to the vehicle wheel by the motor 2 or center motor 3.

In the implementation shown in FIG. 5, both the roll angle and roll angular velocity are used to determine a motor torque to maintain the roll angle. This makes it possible to initiate motor driving before the roll angle of the vehicle-body frame 11 significantly deviates from a reference value (e.g., upright position). This reduces the required motor torque. It will be understood that the standing still assist control is not limited to the implementation shown in FIG. 5. For example, when the roll angle is within a predetermined range from the reference value, the motor controller 5 may cause the motor to output a torque that will generate a roll angular velocity in a direction that cancels the current roll angular velocity. Further, one of the roll angle or roll angular velocity may be used to determine a motor torque.

Figure 6:
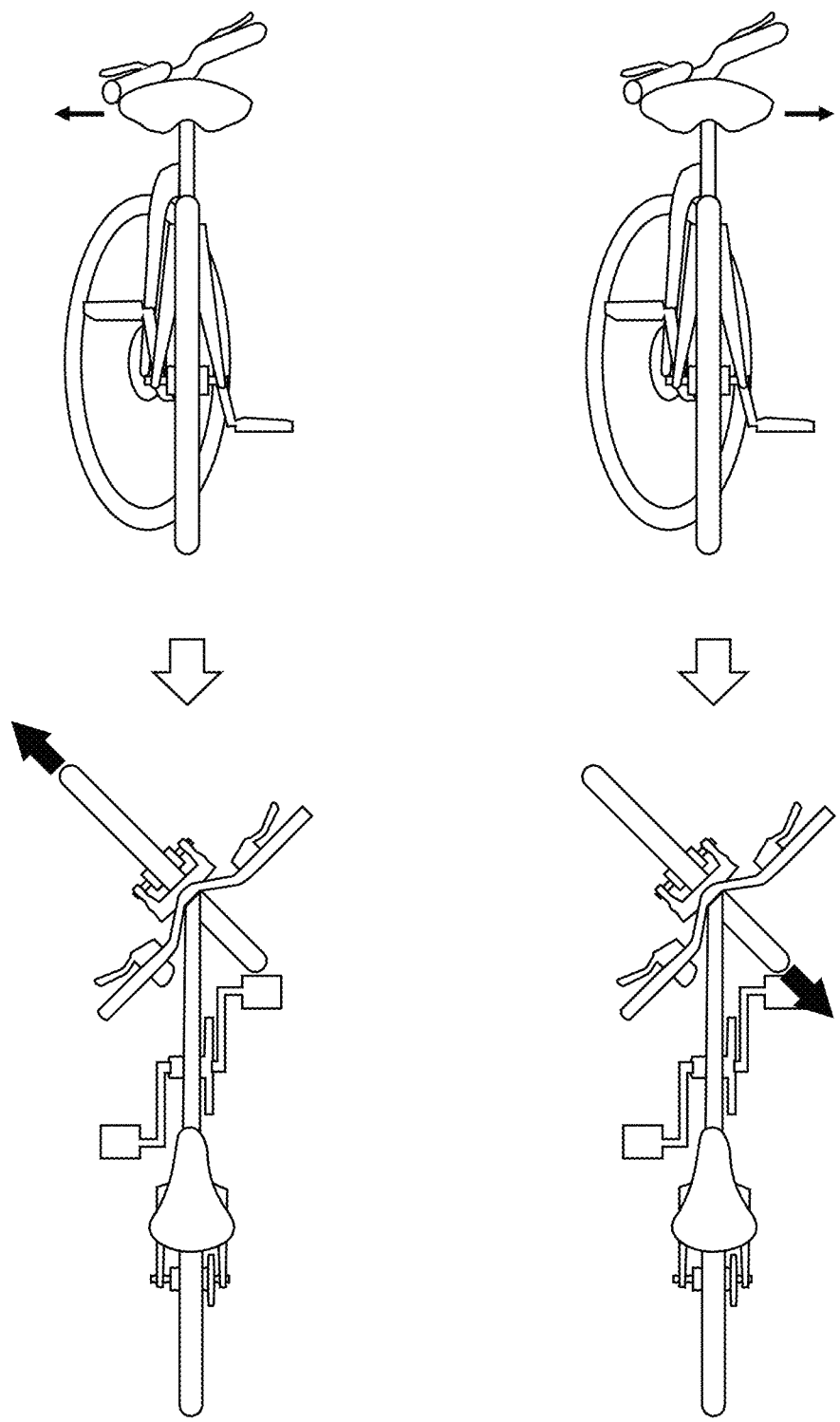
FIG. 6 illustrates how a bicycle behaves during a standing still assist control.
Figure 7:
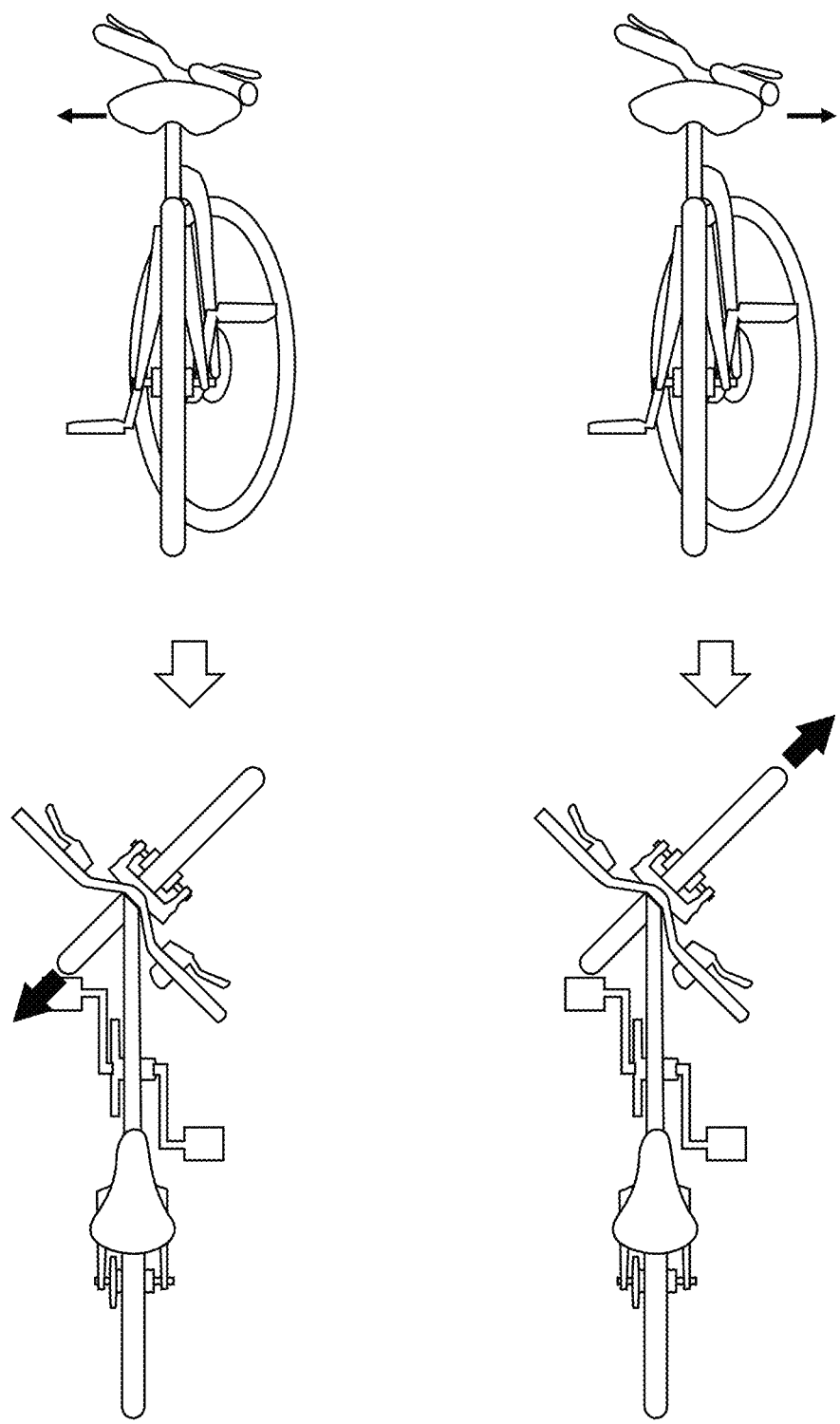
FIG. 7 illustrates how a bicycle behaves during a standing still assist control.

FIGS. 6 and 7 illustrate how the bicycle 10 behaves during the standing still assist control. For example, the above-discussed standing still assist control illustrated in FIG. 5 causes the bicycle 10, which is not traveling, to behave as shown in FIGS. 6 and 7. In the example shown in FIG. 6, when the vehicle is not traveling with the handlebars steered to the left and the vehicle-body frame 11 is about to tilt to the left due to, for example, pedaling by the rider, movement of the center of gravity and other operations, then, the motor applies a torque to cause forward rotation of the vehicle wheel (see drawings in the left half of FIG. 6). When the vehicle-body frame 11 is about to tilt to the right, the motor applies a torque to cause rearward rotation of the vehicle wheel (see drawings in the right half of FIG. 6). In each of these cases, the torque of the vehicle wheel generates a moment in a direction that causes the vehicle-body frame 11 to lift up, thus maintaining the roll angle.

In the example shown in FIG. 7, when the vehicle is not traveling with the handlebars steered to the right and the vehicle-body frame 11 is about to tilt to the left due to, for example, an operation of the rider, the motor applies a torque to cause rearward rotation of the vehicle wheel (see drawings in the left half of FIG. 7). When the vehicle-body frame 11 is about to tilt to the right, the motor applies a torque to cause forward rotation of the vehicle wheel (see drawings in the right half of FIG. 7). In each of these cases, the torque of the vehicle wheel generates a moment in a direction that causes the vehicle-body frame 11 to lift up, thus maintaining the roll angle.

Figure 8:
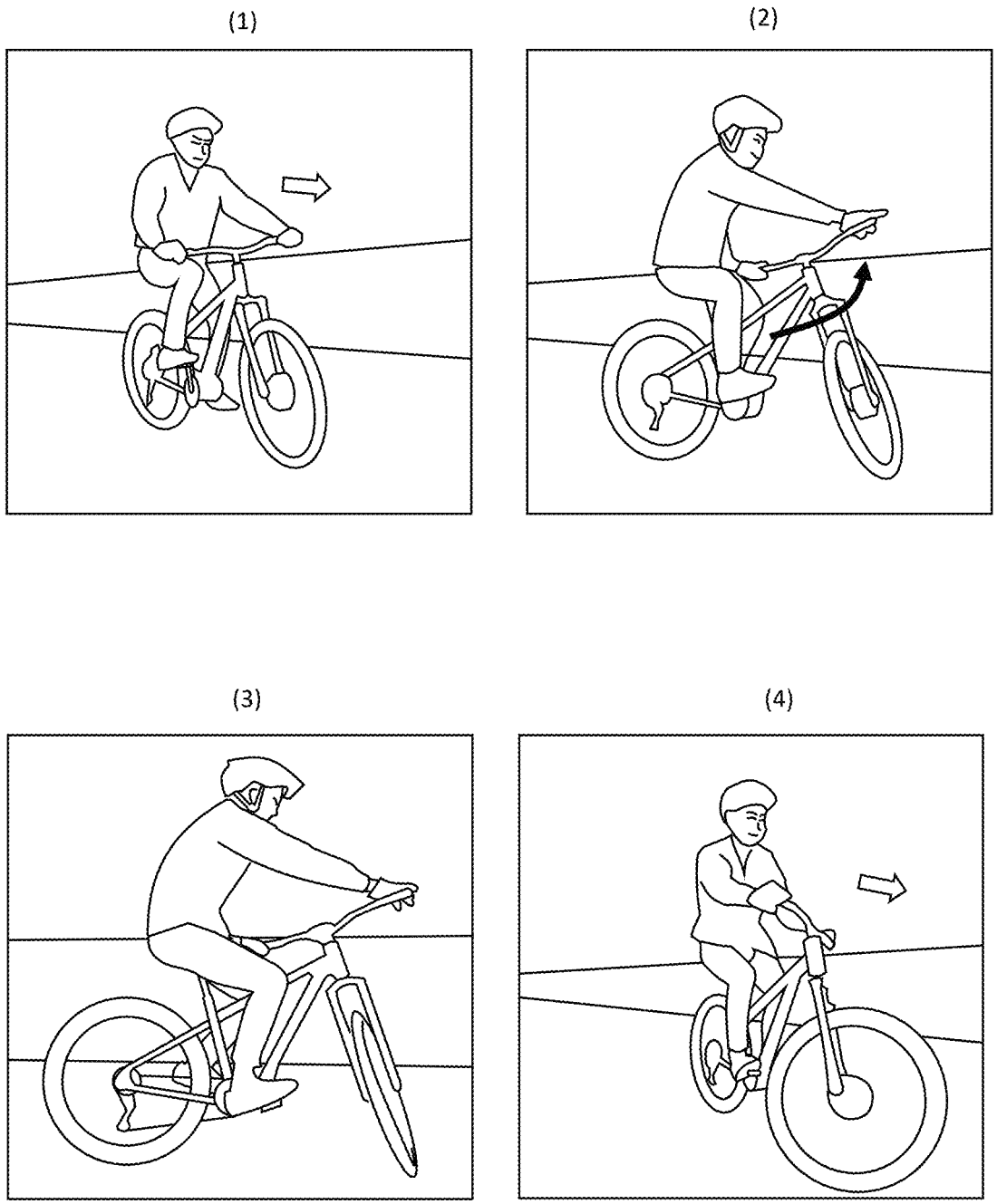
FIG. 8 shows illustrations created from images of a video capturing how a bicycle performs during a standing still assist control.

FIG. 8 shows illustrations created from some images from a video capturing how the bicycle 10 performs a standing still assist control. In FIG. 8, the images are numbered according to time sequence. In the example shown in FIG. 8, in image (1), the rider decelerates the bicycle 10. Thereafter, in image (2), the rider has stopped the bicycle 10 so it is not traveling, with the handlebars steered to the left. This operation of the rider initiates the standing still assist control. At this stage, the rider still has his feet on the pedals. In image (3), the rider, still having his feet on the pedals, slightly adjusts his pedaling force while balancing so that the center of gravity remains at the center in the left-right direction. At this point, the motor reacts to a small change in the roll angle detected by the roll detection unit and applies, to the vehicle wheel, a torque in a direction that maintains the roll angle. Thus, a movement in the roll direction (i.e., left-right direction) that is so small that the rider cannot easily perceive it is able to be canceled by the motor at an early stage.

The rider may apply a torque to cause forward rotation of the rear wheel through their pedaling force, but cannot apply a torque to cause rearward rotation through their pedaling force. If the application of torque to cause rearward rotation is assigned to the motor, the rider is able to easily control the attitude in the roll direction with their pedaling force. The rider is able to adjust both a torque to cause forward rotation and a torque to cause rearward rotation by adjusting the pedaling force while perceiving the torque to cause rearward rotation of the motor by feeling the reaction force of the pedals. For example, when the rider feels excessive torque to cause rearward rotation, the rider is able to pedal to cancel the motor's torque.

It will be understood that the rider may make such a setting that the motor always outputs a torque to cause rearward rotation during the standing still assist control. In this case, the rider is only required to reduce the pedaling force in order to apply a torque to cause rearward rotation of the vehicle wheel. When a torque to cause forward rotation is to be applied to the vehicle wheel, the rider is able to pedal to cancel the torque of the motor and apply a further pedaling force. Such a setting of the standing still assist control may be received from the rider through an input device provided on the handlebars 23 of the bicycle 10.

In image (4) of FIG. 8, the rider returns the handlebars 23 to the middle (i.e., neither steered to the right nor to the left), and is about to press the pedals. When the steering angle becomes zero or pedaling has caused the crankshaft to make one rotation, the standing still assist control is disabled. As the rider continues pedaling, the bicycle 10 starts to move forward.

Figure 9:
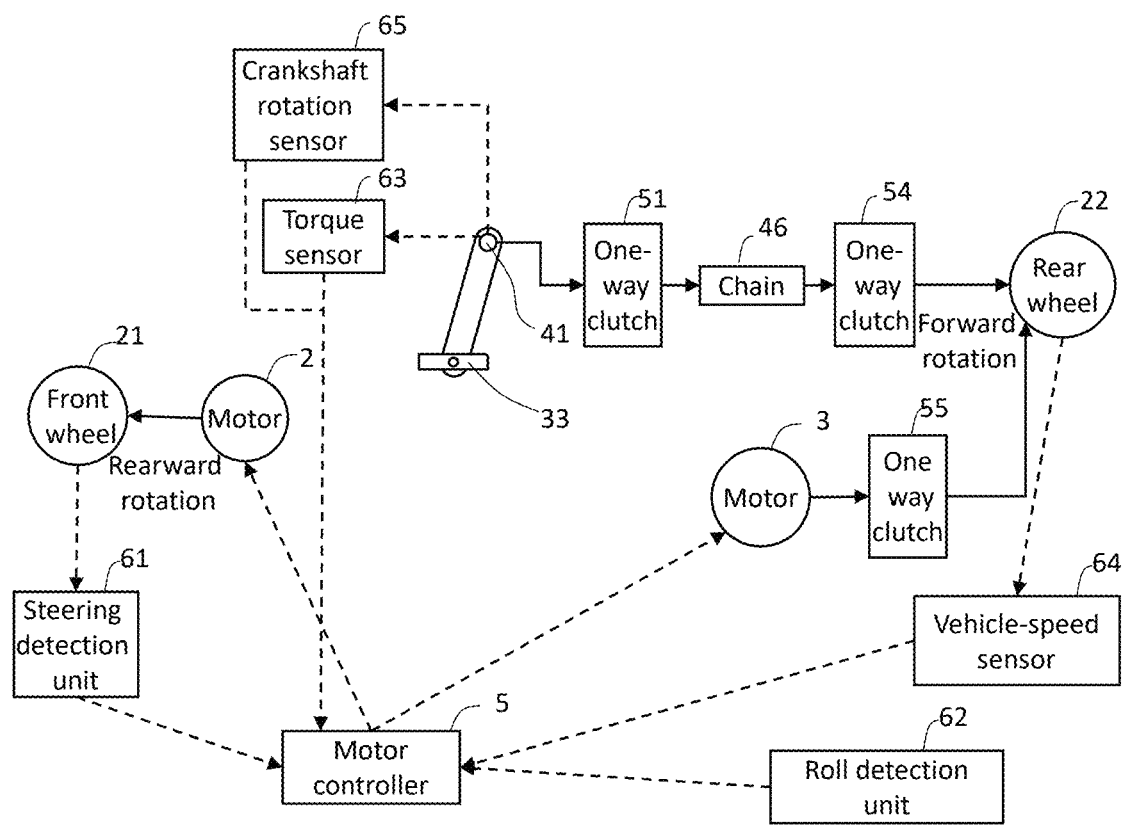
FIG. 9 is a block diagram showing a variation of the configuration of a motor.

FIG. 9 is a block diagram showing a variation of the motor arrangement. In the implementation shown in FIG. 9, a motor 3 is mounted on the hub of the rear wheel 22. In this implementation, the motor 3 may be an in-wheel motor. Since no center motor 3 is provided in this implementation, no driving unit is necessary. The motor 3 applies a torque to cause forward rotation of the rear wheel 22. A one-way clutch 55 is provided between the motor 3 and rear wheel 22 to transmit forward rotation only. In the implementation shown in FIG. 9, during the travel-assist control in the normal mode, the motor controller 5 causes the motor 3 to output an assist force that depends on results of detection by the torque sensor 63 and vehicle-speed sensor 64, as is the case with the implementation of FIG. 2. Alternatively, during the assist-travel control, the motor controller 5 may cause both the motor 2 and motor 3 to output an assist force. During the standing still assist control, the motor controller 5, based on results of detection by the roll detection unit 61 and steering detection unit 62, causes the motor 2 to output a torque to cause rearward rotation and causes the motor 3 to output a torque to cause forward rotation.

Figure 10:
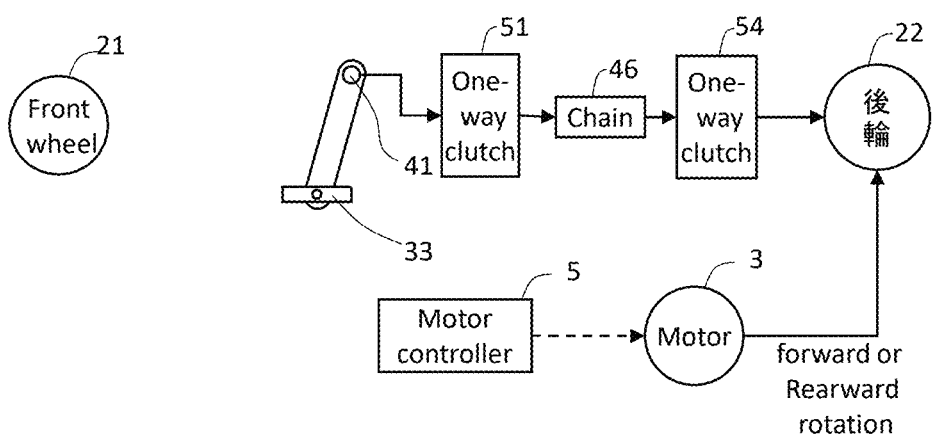
FIG. 10 is a block diagram showing a variation of the configuration of a motor.

FIG. 10 is a block diagram showing a variation of the motor arrangement. FIG. 10 does not show the various sensors and detection units. These sensors and detection units may have the same arrangement as in FIG. 9. The same applies to FIGS. 11 to 13. In the implementation shown in FIG. 10, the motor 3 is provided on the hub of the rear wheel 22, and no motor is provided on the hub of the front wheel 21. No driving unit need be provided. The motor 3 is able to apply, to the rear wheel 22, both a torque to cause forward rotation and a torque to cause rearward rotation. No one-way clutch is provided between the motor 3 and rear wheel 22. During the travel-assist control, the motor controller 5 causes the motor 3 to output a torque to cause forward rotation. During the standing still assist control, the motor controller 5 is able to cause the motor 3 to output both a torque to cause forward rotation and a torque to cause rearward rotation. It will be understood that the motor 3 may output only a torque to cause rearward rotation during the standing still assist control.

Figure 11:
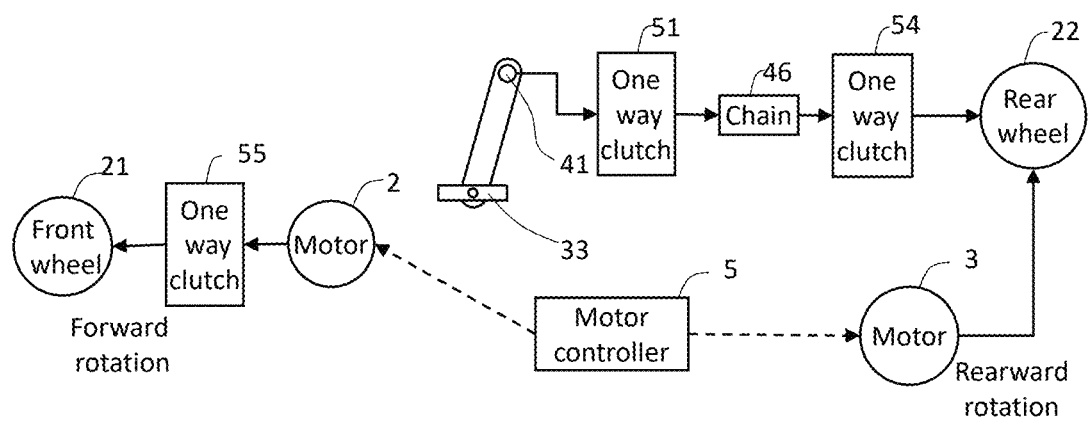
FIG. 11 is a block diagram showing a variation of the configuration of a motor.

FIG. 11 is a block diagram showing a variation of the motor arrangement. In the implementation shown in FIG. 11, the motor 2 is provided on the hub of the front wheel 21, and the motor 3 is provided on the hub of the rear wheel 22. No driving unit is provided. A one-way clutch is provided between the motor 2 and front wheel 21 to transmit forward rotation only. During the travel-assist control, the motor controller 5 causes at least one of the motor 2 or the motor 3 to output a torque to cause forward rotation. During the standing still assist control, the motor controller 5 causes the motor 2 to output a torque to cause forward rotation and causes the motor 3 to output a torque to cause rearward rotation.

Figure 12:
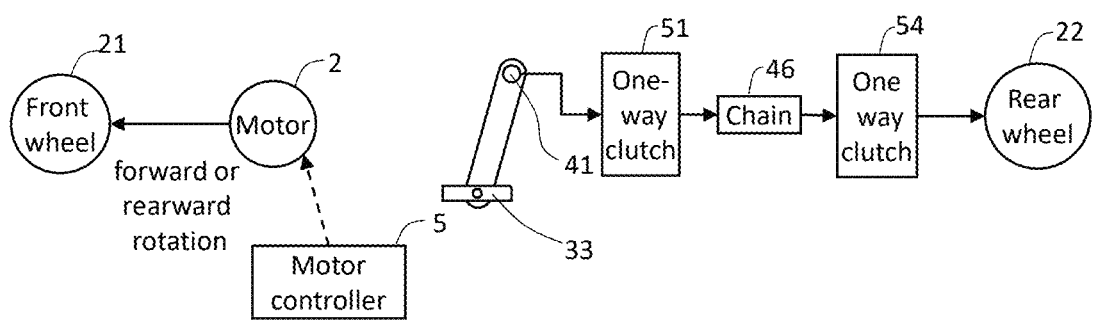
FIG. 12 is a block diagram showing a variation of the configuration of a motor.

FIG. 12 is a block diagram showing a variation of the motor arrangement. In the implementation shown in FIG. 12, the motor 2 is provided on the hub of the front wheel 21, and no motor 3 is provided on the hub of the rear wheel 22. No one-way clutch is provided between the motor 2 and front wheel 21. During the travel-assist control, the motor controller 5 causes the motor 2 to output a torque to cause forward rotation. During the standing still assist control, the motor controller 5 is able to cause the motor 2 to output both a torque to cause forward rotation and a torque to cause rearward rotation. It will be understood that, during the standing still assist control, the motor controller 5 may cause the motor 2 to output only a torque to cause rearward rotation. It will be understood that, in the arrangement of FIG. 12, a further motor may be provided on the hub of the rear wheel 22 to apply both a torque to cause forward rotation and a torque to cause rearward rotation.

Figure 13:
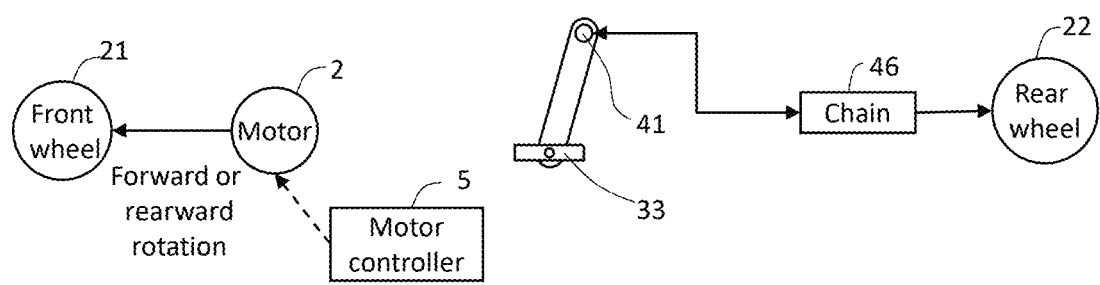
FIG. 13 is a block diagram showing a variation of the configuration of a motor.

FIG. 13 is a block diagram showing a variation of the motor arrangement. The implementation shown in FIG. 13 is the same as the arrangement shown in FIG. 12 except that no one-way clutches are provided between the crankshaft 41 and rear wheel 22. Rotation is transmitted bi-directionally to the rear wheel 22 and crankshaft 41. This arrangement allows the behavior of the motor to be directly transmitted to the rider through pedal rotation.

Arrangements with a motor on one of the front wheel 21 or the rear wheel 22 to apply both a torque to cause forward rotation and a torque to cause rearward rotation, as in the implementations of FIGS. 10, 12 and 13, require only one motor, thereby simplifying the construction and control compared with implementations with two motors. Further, arrangements with a motor 2 on the front wheel 21 to apply both a torque to cause forward rotation and a torque to cause rearward rotation can efficiently provide roll a moment using the torque on the front wheel 21.

Implementations with a motor on each of the front and rear wheels 21 and 22, as those of FIGS. 2, 9 and 11, can control the motors on the front and rear wheels 21 and 22 such that one of the motors outputs a torque to cause forward rotation and the other motor outputs a torque to cause rearward rotation during the standing still assist control. This reduces a switching-induced time lag compared with arrangements where one motor is switched between forward rotation and rearward rotation for output.

The present invention is not limited to the above-described preferred embodiments. For example, the above-described motor controller 5 of the bicycle 10 is configured or programmed to be switched between the assist-travel control in the normal mode and the standing still assist control. Alternatively, the motor controller 5 may be configured or programmed to perform the standing still assist control only, without performing the assist-travel control.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A bicycle comprising:
   a vehicle-body frame;
   a front wheel rotatably supported by the vehicle-body frame and that is a steered wheel;
   a rear wheel rotatably supported by the vehicle-body frame;
   a crankshaft rotatably supported by the vehicle-body frame;
   a pedal connected to the crankshaft to rotate together with the crankshaft;
   a transmission to transmit rotation of the pedal to the rear wheel;
   a motor to apply at least a torque to cause rearward rotation of at least one of the front wheel or the rear wheel;
   a roll detector to detect at least one of a roll angle or a roll angular velocity of the vehicle-body frame; and
   a steering detector to detect a direction of steering of the front wheel; wherein
   when a vehicle speed in a forward direction of the bicycle is zero and a steering angle of the front wheel is not zero, the motor applies, to the at least one of the front wheel or the rear wheel, a torque to maintain the roll angle of the vehicle-body frame based on the direction of steering detected by the steering detector and the at least one of the roll angle or the roll angular velocity of the vehicle-body frame of the bicycle detected by the roll detector; and when the vehicle speed of the bicycle in the forward direction is zero and the steering angle of the front wheel is not zero, a composite torque including (a) torque to cause forward rotation generated by a pedaling force on the pedal by a rider transmitted to the rear wheel via the transmission, and (b) a torque applied by the motor to the at least one of the front wheel or the rear wheel contributes to a change in the roll angle of the vehicle-body frame.

2. The bicycle according to claim 1, wherein the motor is operable to apply the torque to maintain the roll angle when the steering angle of the front wheel satisfies a first steering-angle condition.

3. The bicycle according to claim 1, wherein the motor is operable to apply the torque to maintain the roll angle when the vehicle speed satisfies a first vehicle-speed condition.

4. The bicycle according to claim 1, wherein the motor is a hub motor mounted on a hub of the at least one of the front wheel or the rear wheel.

5. The bicycle according to claim 1, further comprising:
a notifier to notify a rider that the motor is applying the torque to maintain the roll angle.

6. The bicycle according to claim 1, wherein the motor is operable to apply the torque to maintain the roll angle when an inclination angle of a front-rear direction of the bicycle satisfies a first inclination-angle condition.

7. The bicycle according to claim 1, wherein the torque to cause rearward rotation applied by the motor to maintain the roll angle is limited to a range cancelable by the pedaling force of the rider while the vehicle speed in the forward direction of the bicycle is zero.

8. The bicycle according to claim 1, wherein the torque to maintain the roll angle is disabled based on at least one of rotation of the pedal, rotation of the crankshaft, the vehicle speed, the steering angle of the front wheel, the roll angle or the roll angular velocity of the vehicle-body frame, an inclination angle of a front-rear direction of the bicycle, or an input operation by the rider on an input provided on the bicycle.

9. The bicycle according to claim 1, wherein the motor always produces a torque to cause rearward rotation to maintain the roll angle based on an input operation by the rider on an input provided on the bicycle.

10. The bicycle according to claim 1, wherein at least one of a determination as to whether the motor is to apply the torque to maintain the roll angle or an amount of control of the torque to maintain the roll angle is specifiable by an input operation by the rider on an input provided on the bicycle.

11. The bicycle according to claim 1, wherein, when the vehicle speed in the forward direction of the bicycle is zero and the steering angle of the front wheel is not zero, the motor, in response to an initiation of a change in the roll angle from a state where the vehicle-body frame is in an upright position and the roll angle is not changing, applies, to the at least one of the front wheel or the rear wheel a torque in a direction that cancels the change in the roll angle.

12. A bicycle comprising:
a vehicle-body frame;
a front wheel rotatably supported by the vehicle-body frame and that is a steered wheel;
a rear wheel rotatably supported by the vehicle-body frame;
a crankshaft rotatably supported by the vehicle-body frame;
a pedal connected to the crankshaft to rotate together with the crankshaft;
a transmission to transmit rotation of the pedal to the rear wheel;
a motor to apply at least a torque to cause rearward rotation of at least one of the front wheel or the rear wheel;
a roll detector to detect at least one of a roll angle or a roll angular velocity of the vehicle-body frame; and
a steering detector to detect a direction of steering of the front wheel; wherein
when a vehicle speed in a forward direction of the bicycle is zero and a steering angle of the front wheel is not zero, the motor applies, to the at least one of the front wheel or the rear wheel, a torque to maintain the roll angle of the vehicle-body frame based on the direction of steering detected by the steering detector and the at least one of the roll angle or the roll angular velocity of the vehicle-body frame of the bicycle detected by the roll detector; and
the transmission is operable to transmit both forward rotation and rearward rotation of the rear wheel to the pedal.

13. A bicycle comprising:
a vehicle-body frame;
a front wheel rotatably supported by the vehicle-body frame and that is a steered wheel;
a rear wheel rotatably supported by the vehicle-body frame;
a crankshaft rotatably supported by the vehicle-body frame;
a pedal connected to the crankshaft to rotate together with the crankshaft;
a transmission to transmit rotation of the pedal to the rear wheel;
a motor to apply at least a torque to cause rearward rotation of at least one of the front wheel or the rear wheel;
a roll detector to detect at least one of a roll angle or a roll angular velocity of the vehicle-body frame; and
a steering detector to detect a direction of steering of the front wheel; wherein
when a vehicle speed in a forward direction of the bicycle is zero and a steering angle of the front wheel is not zero, the motor applies, to the at least one of the front wheel or the rear wheel, a torque to maintain the roll angle of the vehicle-body frame based on the direction of steering detected by the steering detector and the at least one of the roll angle or the roll angular velocity of the vehicle-body frame of the bicycle detected by the roll detector;
when the vehicle speed in the forward direction of the bicycle is zero and the steering angle of the front wheel is not zero, the motor is controlled to apply a torque to cause forward rotation of the at least one of the front wheel or the rear wheel when the vehicle-body frame is about to tilt toward a direction to which the front wheel is steered; and
the motor is controlled to apply the torque to cause rearward rotation of the at least one of the front wheel or the rear wheel when the vehicle-body frame is about to tilt toward a direction opposite to the direction to which the front wheel is steered.

* * * * *